US012787095B2

(12) United States Patent
Zhang et al.

(10) Patent No.: US 12,787,095 B2
(45) Date of Patent: Nov. 3, 2026

(54) METHOD PERFORMED BY USER EQUIPMENT AND USER EQUIPMENT

(71) Applicant: SHARP KABUSHIKI KAISHA, Sakai City (JP)

(72) Inventors: Chongming Zhang, Shanghai (CN); Renmao Liu, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 328 days.

(21) Appl. No.: 18/567,190

(22) PCT Filed: Jun. 8, 2022

(86) PCT No.: PCT/CN2022/097647
§ 371 (c)(1),
(2) Date: Dec. 5, 2023

(87) PCT Pub. No.: WO2022/257975
PCT Pub. Date: Dec. 15, 2022

(65) Prior Publication Data

US 2024/0260111 A1 Aug. 1, 2024

(30) Foreign Application Priority Data

Jun. 10, 2021 (CN) ......................... 202110650788.0

(51) Int. Cl.
*H04W 76/14* (2018.01)
*H04W 76/18* (2018.01)
(Continued)

(52) U.S. Cl.
CPC ........... *H04W 76/18* (2018.02); *H04W 76/27* (2018.02); *H04W 36/08* (2013.01)

(58) Field of Classification Search
None
See application file for complete search history.

(56) References Cited

U.S. PATENT DOCUMENTS

2023/0129741 A1* 4/2023 Ji .................... H04W 36/00837 370/329

FOREIGN PATENT DOCUMENTS

| | | | |
|---|---|---|---|
| CN | 108307472 | A | 7/2018 |
| KR | 20180122836 | A | 11/2018 |
| WO | 2020/259811 | A1 | 12/2020 |

OTHER PUBLICATIONS

Samsung, "Report of [AT114-e][605][Relay] Summary on AI 8.7.4.2 on L2 relay service continuity", R2-2106578, 3GPP TSG-RAN WG2 Meeting #114-e, Online, May 19-May 27, 2021.

(Continued)

*Primary Examiner* — Anez C Ebrahim
(74) *Attorney, Agent, or Firm* — ScienBiziP, P.C.

(57) ABSTRACT

Provided in the present invention are a method performed by user equipment and user equipment. The method performed by user equipment includes the following steps: receiving, by the user equipment (UE), a message or command transmitted from a base station, wherein the message is a radio resource control (RRC) reconfiguration message, and the message at least comprises information related to switching the UE to target relay UE, or information instructing the UE to establish an indirect connection to the base station by means of the target relay UE, or an identifier of the target relay UE, or PC5 configuration information; and performing, by the UE upon receiving the message or command, switching from a direct connection to the base station to the indirect connection to the base station by means of the relay UE on the basis of the message or command.

3 Claims, 2 Drawing Sheets

(A)

(B)

(C)

(51) Int. Cl.
*H04W 76/27* (2018.01)
*H04W 36/08* (2009.01)

(56) References Cited

OTHER PUBLICATIONS

Apple (rapporteur), "Summary Report of [Post111-e][622][Relay] Relay selection and reselection", R2-2009523, 3GPP TSG-RAN WG2 #112-e, E-meeting, Nov. 2-13, 2020.

* cited by examiner (A)

(B)

(C)

METHOD PERFORMED BY USER EQUIPMENT AND USER EQUIPMENT

TECHNICAL FIELD

The present invention relates to the technical field of wireless communications. More specifically, the present invention relates to a method performed by user equipment and user equipment.

BACKGROUND

In a cell covered by a base station, user equipment (UE) can directly communicate with the base station, and such a communication connection is called a direct connection. The UE may also be in communication connection with the base station by means of relay UE, and such a connection may be called an indirect connection. In a scenario in which the UE communicates with the base station by means of the relay UE, the UE is called remote UE.

In order to ensure the continuity of communication services, the UE directly connected to the base station can be switched/handed over to a relay UE under instruction of the base station, so as to achieve the indirect connection to the base station.

In the above situation, how the UE manages the process of the switch/handover from the direct connection to the indirect connection needs to be solved.

SUMMARY

In order to address the aforementioned issue, the present invention provides a method performed by user equipment and user equipment.

According to an aspect of the present invention, provided is a method performed by user equipment, comprising the following steps:

- receiving, by the user equipment (UE), a message or command transmitted from a base station, wherein the message is an RRC reconfiguration message, and the message at least comprises information related to switching the UE to target relay UE, or information instructing the UE to establish an indirect connection to the base station by means of the target relay UE, or an identifier of the target relay UE, or PC5 configuration information; and
- performing, by the UE upon receiving the message or command, switching from a direct connection to the base station to the indirect connection to the base station by means of the relay UE on the basis of the message or command.

In the foregoing method performed by user equipment, preferably, the following step is further comprised:

- starting, by the UE upon receiving the message or command, a switching management timer.

In the foregoing method performed by user equipment, preferably, the following step is further comprised:

- if the UE transmits a response message for the message or command during the running of the switching management timer, then stopping, by the UE, the running switching management timer;
- if the UE does not transmit the response message for the message or command during the running of the switching management timer, then when the switching management timer expires, triggering or initiating, by the UE, an RRC connection re-establishment procedure, and performing cell selection and relay UE selection during the procedure.

In the foregoing method performed by user equipment, preferably, the following step is further comprised:

- if the UE receives indication information during the running of the switching management timer and the indication information at least comprises information related to successful establishment of a PC5 connection between the UE and the target relay UE, then stopping, by the UE, the running switching management timer.

In the foregoing method performed by user equipment, preferably, the following step is further comprised:

- if the UE determines that there is a PC5 connection to the target relay UE, then stopping, by the UE, the running switching management timer;
- if the UE determines that there is no PC5 connection to the target relay UE, then when the UE receives indication information and the indication information at least comprises information related to successful establishment of the PC5 connection between the UE and the target relay UE, stopping, by the UE, the running switching management timer.

In the foregoing method performed by user equipment, preferably, the following step is further comprised:

- determining, by the UE upon receiving the message or command, whether the PC5 connection to the target relay UE exists.

In the foregoing method performed by user equipment, preferably, the following step is further comprised:

- if the UE determines that the PC5 connection to the target relay UE exists, then skipping, by the UE, starting the switching management timer;
- if the UE determines that there is no PC5 connection to the target relay UE, starting, by the UE, the switching management timer.

In the foregoing method performed by user equipment, preferably, the following step is further comprised:

- if the UE transmits a response message for the message or command during the running of the switching management timer, then stopping, by the UE, the running switching management timer;
- if the UE does not transmit the response message for the message or command during the running of the switching management timer, then when the switching management timer expires, triggering or initiating, by the UE, an RRC connection re-establishment procedure, and performing cell selection and relay UE selection during the procedure.

In the foregoing method performed by user equipment, preferably, the following step is further comprised:

- stopping, by the UE upon receiving response information for the response message, the running switching management timer, wherein the response information for the response message is:
- a PC5 RRC message or PC5-S message transmitted from the target relay UE and received by the UE after transmitting the response message;
- an RRC reconfiguration message from the base station received by the UE after transmitting the response message;
- acknowledgment information ACK received by the UE from a lower layer after transmitting the response message; or
- acknowledgment information ACK transmitted from the target relay UE and received by the UE after transmitting the response message.

According to another aspect of the present invention, user equipment is provided, comprising:

a processor; and a memory storing instructions, the instructions, when run by the processor, causing the user equipment to perform the method described above.

According to the method performed by user equipment and the corresponding user equipment involved in the present invention, the UE can effectively manage a switching procedure from a direct connection to an indirect connection.

DETAILED DESCRIPTION

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment
NR: New Radio
LTE: Long Term Evolution
eLTE: enhanced Long Term Evolution
RRC: Radio Resource Control (layer)
MAC: Medium Access Control (layer)
RLC: Radio Link Control (layer)
PDCP: Packet Data Convergence Protocol (layer)
MAC CE: MAC Control Element
RRC: Radio Resource Control
RRC_CONNECTED: RRC connected state
RRC_INACTIVE: RRC inactive state
RRC_IDLE: RRC idle state
RAN: Radio Access Network
Sidelink: Sidelink communication
SL: Sidelink
ProSe: Proximity-based Services
SCI: Sidelink Control Information
SRB: Signaling Radio Bearer
DRB: Data Radio Bearer
V2X: Vehicle to X Communication
CCCH: Common Control Channel
DCCH: Dedicated Control Channel
NAS: Non-Access Stratum A plurality of embodiments according to the present invention are specifically described below, with an NR mobile communications system and its subsequent evolved version serving as exemplary application environments, and with a base station and UE that support NR serving as examples. However, it should be noted that the present invention is not limited to the following embodiments, but is applicable to more other wireless communications systems, such as an eLTE communication system, or an NB-Iot system, or an LTE-M system. Moreover, the present invention may be applicable to other base stations and user equipment, such as base stations and user equipment supporting eLTE/NB-IoT/LTE-M.

In NR access technology, UE and a base station are connected by means of a Uu interface. According to the connection status of the UE over the Uu interface, the states of the UE can be divided into an RRC idle state (IDLE), an RRC connected state, and an RRC inactive state (INACTIVE). In the RRC inactive state, although the UE has no connection over the air interface, an access stratum context (AS context) of the UE is reserved on the base station side and the UE side, and the UE is assigned an I-RNTI, which is used by the UE to resume an RRC connection. This intermediate state can be considered as a connection suspended state, or it can be considered as a connection inactive state.

Figure 1:
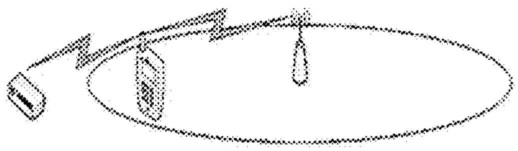
FIG. 1 is a schematic diagram showing UE-to-network relay.
Figure 1:
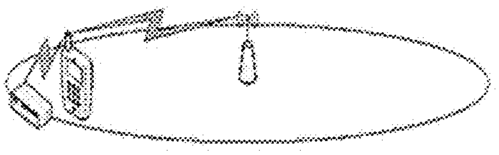
Figure 1:
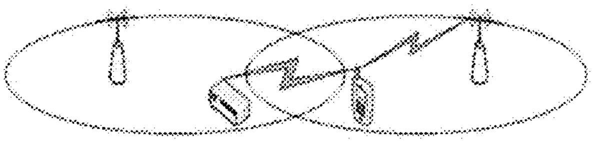

UE-to-network relay is as shown in FIG. 1. In scenario 1(A) and scenario 2(B), the left side is remote UE, the middle is relay UE, and the right side is a network (also referred to as a base station, a network, or an NW in the present specification). In scenario 3(C), the two sides are networks, and the middle, from left to right, is remote UE and relay UE, respectively. The remote UE and the relay UE are connected to each other by means of a PC5 interface, and the relay UE is connected to the network by means of a Uu interface. Because the remote UE is far from the network or because the communication environment is poor, the relay UE is needed to relay and forward signaling and data between the remote UE and the network.

Figure 2:
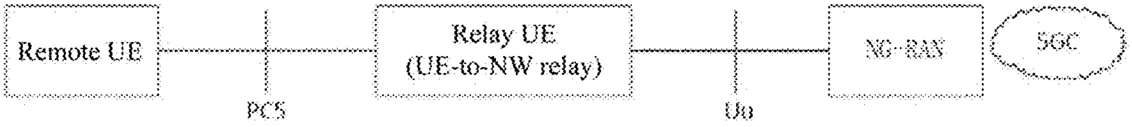
FIG. 2 is a schematic diagram showing a UE-to-network relay architecture interface.

A UE-to-network relay architecture interface is as shown in FIG. 2, in which the remote UE and the relay UE are connected by means of a PC5 (ProSe protocol 5) interface. A PC5 interface is an interface for performing control plane and user plane sidelink communication between UE and UE. For sidelink unicast, a PC5-RRC connection is an access stratum (AS) logical connection between a pair of a source layer-2 ID and a target layer-2 ID. Setup of one PC5 unicast link corresponds to setup of one PC5-RRC connection. A PC5-RRC message refers to a message transmitted on the PC5-RRC connection, which is mainly generated and processed by a PC5 RRC layer of the UE. A PC5-S connection is a non-access stratum (NAS) logical connection between a pair of a source layer-2 ID and a target layer-2 ID, or may be considered as a logical connection at a sidelink communication higher layer. A PC5-S message (also referred to as PC5-S signaling) refers to a message or signaling transmitted on the PC5 non-access stratum, and is mainly generated or processed by a non-access stratum of the PC5 interface.

Signaling bearer (SRB)

SRB0 is used to bear an RRC message transmitted using a logical channel of a common control channel (CCCH).

SRB1 is used to bear an RRC message and a non-access stratum message transmitted using a logical channel corresponding to a dedicated control channel (DCCH).

SRB2 is a non-access stratum (NAS) message and an RRC message carrying measurement information for transmission using a logical channel corresponding to a dedicated control channel.

Embodiment 1

Figure 3:
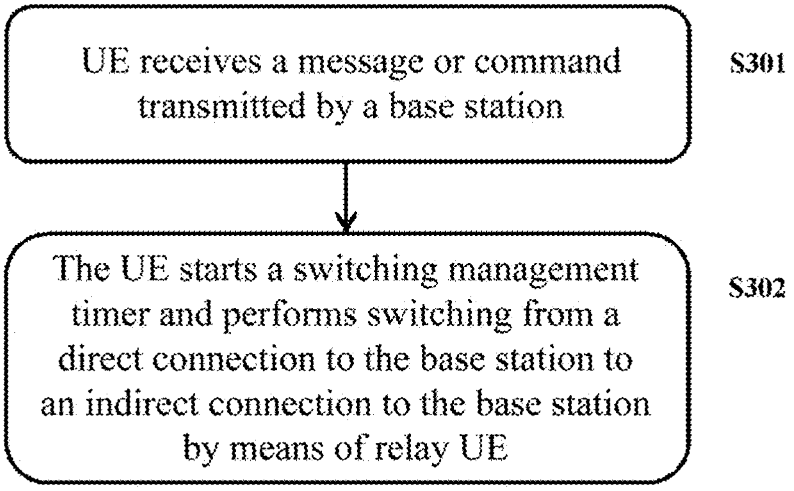
FIG. 3 is a flowchart showing a method performed by user equipment according to an embodiment of the present invention.

The present embodiment provides a processing method for UE, which, as shown in FIG. 3, includes the following steps.

In step 1 (S301), the UE receives a message or command transmitted by a base station, which may be generally an RRC reconfiguration message. The message at least includes information related to switching the UE to target relay UE, or information instructing the UE to establish an indirect connection to the base station by means of the target relay UE. The message may include at least an identifier of the target relay UE, and may further include PC5 configuration information, etc.

In step 2 (S302), when the UE receives the message or command, the UE starts a switching management timer T-switch from direct to indirect, and preferably, further performs a switching operation from a direct connection to the base station to the indirect connection to the base station by means of the relay UE. Such an operation may include one or a plurality of the following operations:

- applying configuration information (configurations) included in the message or command;
- halting or suspending an SRB and/or a DRB, which may be, preferably, suspending all signaling bearers (radio bear), including all SRBs and all DRBs, or suspending all SRBs/DRBs except SRB1, or suspending all SRBs/DRBs except SRB0 and SRB1;
- reconstructing a PDCP entity;
- reconstructing an RLC entity, which is, preferably, establishing a PC5 RLC entity for an SRB or/and a DRB;
- stopping data transmission with the base station; and
- establishing a PC5 connection to the target relay UE, etc.

Step 3: During the running of the switching management timer T-switch from direct to indirect, the UE transmits a response message for the message or command, such as an RRC reconfiguration complete message. Specifically, the UE may deliver such a response message to a lower layer (such as a PDCP layer or an RLC layer below the RRC layer, or a MAC layer, or a physical layer) for transmission. At the same time, the UE stops the running switching management timer T-switch from direct to indirect. On the basis of the foregoing operations, the UE may further determine/consider that the switching is successfully completed.

In step 4, as a supplement to step 3, if the UE does not transmit the corresponding response message during the running of the switching management timer T-switch from direct to indirect, or the UE does not transmit the corresponding response message until the switching management timer T-switch from direct to indirect expires, then when the switching management timer T-switch from direct to indirect expires, the UE triggers or initiates an RRC connection re-establishment procedure, and may perform cell selection and relay UE selection during the procedure.

Embodiment 2

The difference between Embodiment 2 and Embodiment 1 lies in step 3.

In step 3, during the running of the switching management timer T-switch from direct to indirect, if the UE receives indication information and the indication information at least includes information related to successful establishment of the PC5 connection between the UE and the target relay UE, then the UE stops the running switching management timer T-switch from direct to indirect. The UE can determine/consider that the switching is successfully completed at this time. Preferably, the successful establishment of the PC5 connection may refer to connection establishment of a PC5 signaling layer or connection establishment of a PC5 RRC layer.

The indication information herein may be from an upper layer of the UE, i.e., a PC5-S layer where the UE manages PC5 signaling, or from a V2X layer of the UE. Further, the PC5 connection may be a PC5 connection established between the UE and the relay UE, such that an upper layer of the UE notifies/delivers the indication information to the RRC layer of the UE.

The indication information herein may also be from the relay UE, and the relay UE transmits the indication information to the UE to confirm that the PC5 connection therebetween is successfully established.

Embodiment 3

The difference between Embodiment 3 and Embodiment 1 lies in step 3.

In step 3, the UE determines whether there is a PC5 connection to the target relay UE, and performs a corresponding operation.

If the UE determines that the PC5 connection to the target relay UE exists, and preferably, the UE further determines that the reference signal receiving level quality or the reference signal received power (RSRP) of the PC5 connection to the target relay UE is higher than or not lower than a preset threshold value, then the UE can stop the running switching management timer T-switch from direct to indirect;

- if the UE determines that there is no PC5 connection to the target relay UE, then when the UE receives indication information and the indication information at least includes information related to successful establishment of the PC5 connection between the UE and the target relay UE, the UE stops the running switching management timer T-switch from direct to indirect.

Embodiment 4

The difference between Embodiment 4 and Embodiment 1 lies in step 1 and step 2.

In step 1, the UE receives the message or command transmitted by the base station, which generally can be an RRC reconfiguration message, and the message at least includes information related to switching the UE to the target relay UE. For example, the message includes the identifier of the target relay UE, and may further include PC5 configuration information, etc.

In step 2, when the UE receives the message or command, the UE determines whether there is a PC5 connection to the target relay UE.

If the UE determines that the PC5 connection to the target relay UE exists, the UE may skip starting the switching management timer T-switch from direct to indirect. Further, optionally, the UE may determine that the switching is successfully completed at this time.

If the UE determines that there is no PC5 connection to the target relay UE, then the UE starts the switching management timer T-switch from direct to indirect.

Correspondingly, during the running of the switching management timer T-switch from direct to indirect, the UE may perform the operation of step 3 or step 4 in the foregoing embodiments.

Embodiment 5

The difference between Embodiment 5 and Embodiment 1 lies in step 3.

In step 3, during the running of the switching management timer T-switch from direct to indirect, the UE transmits the response message for the message or command, such as an RRC reconfiguration complete message. Specifically, the UE may deliver such a response message to a lower layer for transmission.

When the UE receives response information for the response message, the UE stops the running switching management timer T-switch from direct to indirect. Further, optionally, the UE may determine that the switching is successfully completed.

Herein, the "response information for the response message" may be one of the following cases:

after transmitting the response message, the UE receives a PC5 RRC message transmitted from the target relay UE, such as a PC5 RRC configuration message, to reconfigure PC5 interface communication of the UE; or a PC5-S message transmitted from the target relay UE.

After transmitting the response message, the UE receives an RRC reconfiguration message from the base station, which is, preferably, the first RRC reconfiguration message received by the UE after transmitting the response message.

After transmitting the response message, the UE receives acknowledgment information (acknowledge, ACK) from the lower layer, and confirms that the response message has been successfully transmitted.

After transmitting the response message, the UE receives acknowledgment information (acknowledge, ACK) transmitted from the target relay UE, and confirms that the response message has been successfully transmitted. The acknowledgment information can be carried in a MAC CE or in SCI.

Embodiment 6

On the basis of the foregoing embodiments, when the UE can determine/consider that the switching is successfully completed, or at the moment when the UE can determine/consider that the switching is successfully completed, the UE can resume a halted or suspended SRB or DRB, such as SRB2 and all DRBs, and optionally, resume transmission of the SRB or the DRB, such as transmission of SRB2 and all of the DRBs.

Figure 4:
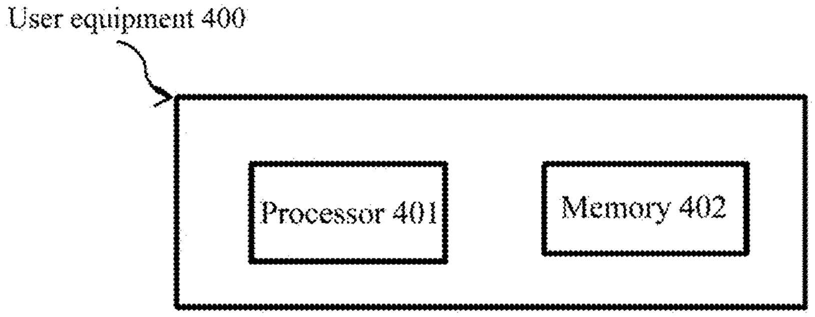
FIG. 4 is a simplified structural block diagram of user equipment according to the present invention.

FIG. 4 is a simplified structural block diagram of user equipment according to the present invention.

As shown in FIG. 4, the user equipment 400 at least includes a processor 401 and a memory 402. The processor 401 may include, for example, a microprocessor, a microcontroller, an embedded processor, and the like. The memory 402 may include, for example, a volatile memory (for example, a random access memory (RAM)), a hard disk drive (HDD), a non-volatile memory (for example, a flash memory), or other memory systems. The memory 402 stores program instructions. The instructions, when run by the processor 401, can perform the above method performed by user equipment described in detail in the present disclosure.

The methods and related devices according to the present disclosure have been described above in conjunction with preferred embodiments. It should be understood by those skilled in the art that the method shown above is only exemplary, and the above embodiments can be combined with one another as long as no contradiction arises. The method of the present invention is not limited to the steps or sequences illustrated above.

The user equipment shown above may include more modules, for example, may also include modules that can be developed or developed in the future and can be used for base stations, MMEs, or UE, and so on. Various identifiers shown above are only exemplary, not for limitation, and the present disclosure is not limited to specific information elements serving as examples of these identifiers. A person skilled in the art could make various alterations and modifications according to the teachings of the illustrated embodiments.

It should be understood that the above embodiments of the present disclosure may be implemented through software, hardware, or a combination of software and hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application-specific integrated circuit (ASIC), a field-programmable gate array (FPGA), a complex programmable logic device (CPLD), and the like.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing the programs by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application-specific integrated circuits (ASICs), field-programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices mounted indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A user equipment (UE), comprising:

a processor; and a memory in electronic communication with the processor and storing instructions that, when executed by the processor, cause the UE to:

receive, from a network, a Radio Resource Control (RRC) reconfiguration message including information for switching to a target relay UE and an identity of the target relay UE;

start a timer and perform a ProSe protocol 5 (PC5)-RRC connection establishment with the target relay UE;

submit an RRC reconfiguration complete message to a lower layer for transmission;

upon reception of an acknowledgement for the RRC reconfiguration complete message from the target relay UE, stop the timer; and in a case that the timer expires, initiate an RRC re-establishment procedure.

2. A method performed by a user equipment (UE), the method comprising:

receiving, from a network, a Radio Resource Control (RRC) reconfiguration message including information for switching to a target relay UE and an identity of the target relay UE;

starting a timer and performing a ProSe protocol 5 (PC5)-RRC connection establishment with the target relay UE;

submitting an RRC reconfiguration complete message to a lower layer for transmission;

upon reception of an acknowledgement for the RRC reconfiguration complete message from the target relay UE, stopping the timer; and in a case that the timer expires, initiating an RRC re-establishment procedure.

3. A base station apparatus that communicates with a user equipment (UE), the base station apparatus comprising:

a processor; and a memory in electronic communication with the processor and storing instructions that, when executed by the processor, cause the base station to:

transmit, to the UE, a Radio Resource Control (RRC) reconfiguration message including information for switching to a target relay UE and an identity of the target relay UE, thereby causing the UE to:

start a timer and perform a ProSe protocol 5 (PC5)-RRC connection establishment with the target relay UE;

submit an RRC reconfiguration complete message to a lower layer for transmission;

upon reception of an acknowledgement for the RRC reconfiguration complete message from the target relay UE, stop the timer; and in a case that the timer expires, initiate an RRC re-establishment procedure.

* * * * *